United States Patent [19]

Braly

[11] 4,204,271
[45] May 20, 1980

[54] ILLUMINATED WEATHER VANE

[76] Inventor: Henry L. Braly, 5 Neptune Dr., Mumford Cove, Groton, Conn. 06340

[21] Appl. No.: 877,252

[22] Filed: Feb. 13, 1978

[51] Int. Cl.² ............................ F21S 1/02; F21S 3/10
[52] U.S. Cl. .................................. 362/145; 73/188; 362/253; 362/363
[58] Field of Search ................ 362/253, 363, 145; 73/188; D10/59; 40/480, 441, 557

[56] References Cited

U.S. PATENT DOCUMENTS

| 215,028 | 5/1879 | Turner | 73/188 |
| 993,800 | 5/1911 | Shotwell | 73/188 |
| 1,213,714 | 1/1917 | Washburne et al. | 73/188 |
| 1,942,039 | 1/1934 | Tyler | 73/188 |
| 2,965,991 | 12/1960 | Simmons | 73/188 |
| 3,354,715 | 11/1967 | Causey | 73/188 |

Primary Examiner—Harold J. Tudor
Attorney, Agent, or Firm—Albert W. Hilburger

[57] ABSTRACT

An illuminated weather vane assembly in which the socket for an electrical lamp is centrally mounted on a base. An ornamental translucent globe supported on the base and surrounding the lamp socket for its protection is held in place by a plurality of support bars which also mount a support member for a wind direction vane positioned above the globe. The vane is responsive to light wind changes and indicates wind direction in conjunction with cardinal point letters mounted to the ends of support fingers which radiate outwardly from the base. As desired for aesthetic reasons and for variety, the pointer and tailpiece of the vane, the globe, and the cardinal point letters are all removable and replaceable.

8 Claims, 8 Drawing Figures

ILLUMINATED WEATHER VANE

BACKGROUND OF THE INVENTION

1. Field of the Invention

This invention relates generally to weather vanes and, specifically, to improvements in weather vanes of the illuminated variety.

2. Description of the Prior Art

For a very long time, weather vanes have aroused the interest of inventors and innovators and the results of their efforts have been both functional and decorative. These have been aids in man's age-old quest to forecast the weather and have simultaneously served as elaborate decorations for homes and other structures. In some instances, these constructions have been complex and, therefore, expensive to manufacture and maintain. For example, the wind vane element itself was often mounted for rotation about a vertical axis by means of expensive bearings. Yet, despite the use of such expensive bearings, the wind vane oftentimes found itself out of plane with the horizontal thereby resulting in inaccurate indications of wind direction. Nor to the knowledge of the present inventor, did the prior art address itself to the use of interchangeable components for aesthetic purposes.

SUMMARY OF THE INVENTION

The present invention is considered to be a new concept in the art of constructing weather vanes. According to this concept, the central element of the weather vane is a globe of stained glass or other suitable translucent material which can be varied in color, shape, and size to beautify a family home or a commercial or industrial building. To this end, a socket for an electrical lamp is centrally mounted on a base. The ornamental translucent globe is supported on the base and surrounds the lamp socket. The globe is held in place by a plurality of support bars which also mount a support member for a wind direction vane positioned above the globe. The vane is responsive to light wind changes and indicates wind direction in conjunction with cardinal point letters mounted to the ends of support fingers which radiate outwardly from the base. As desired for aesthetic reasons and for variety, the pointer and tailpiece of the vane, the globe, and the cardinal point letters are all removable and replaceable.

The assembly is of simplified construction and at the same time provides a pleasing appearance to the viewer. In addition to being aesthetically pleasing, the globe is appropriately sealed to protect the lamp assembly from the elements of the weather. Additionally, the globe is positioned between the wind vane itself and the cardinal point letters for maximum illumination of both during periods of darkness.

The wind vane is mounted on top of the globe and thereby benefits in an aerodynamic sense. It is supported on a single point which assures that it always assumes a position lying in a horizontal plane. This construction assures its accuracy and minimizes friction between the vane and its support enabling it to be sensitive to light wind changes.

It is to be understood that both the foregoing general description and the following detailed description are exemplary and explanatory but are not restrictive of the invention.

The accompanying drawings, which are incorporated in, and constitute a part of this invention illustrate a preferred embodiment of the invention and, together with the description, serve to explain the principles of the invention. Throughout the drawings and the specification, like numerals refer to like parts.

DETAILED DESCRIPTION OF THE DRAWINGS

DESCRIPTION OF THE PREFERRED EMBODIMENTS

Figure 1:
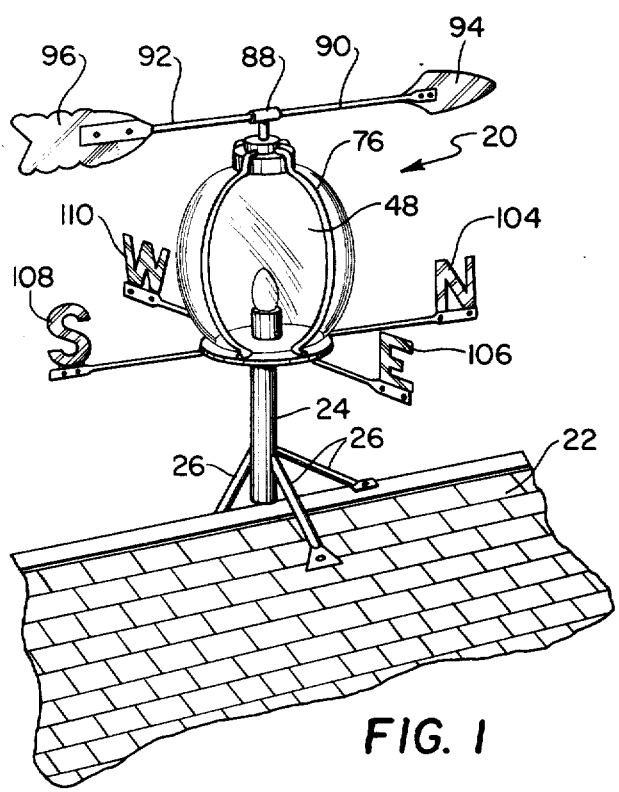
FIG. 1 is a perspective view of a weather vane incorporating the principles of the invention illustrated being mounted on the roof of a house.

Refer now to the drawings and initially to FIG. 1 which illustrates an illuminated weather vane assembly 20 constructed in accordance with the principles of this invention. The assembly 20 is shown mounted on a roof of a house 22 by means of a stanchion 24 appropriately stabilized by a plurality of struts 26.

Figure 2:
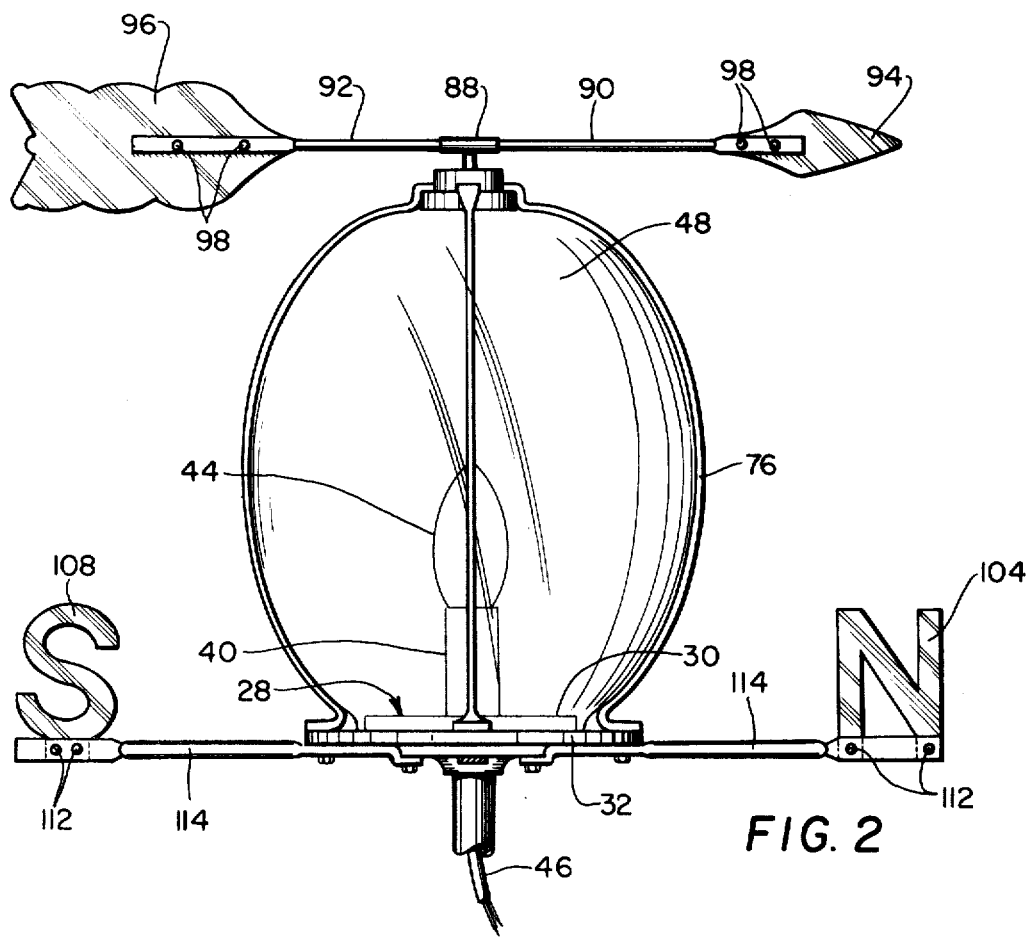
FIG. 2 is a side elevation view of the weather vane illustrated in FIG. 1, certain parts being cut away and in section.
Figure 3:
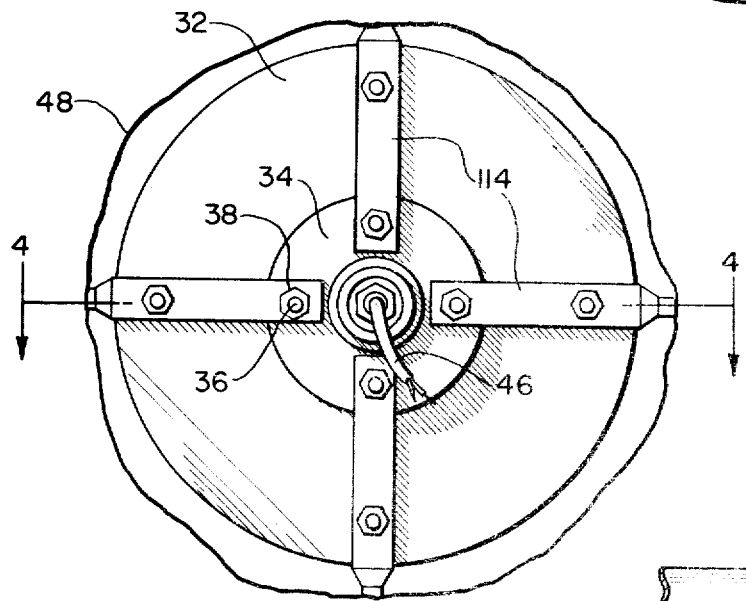
FIG. 3 is a detail bottom plan view of elements illustrated in FIG. 2.
Figure 4:
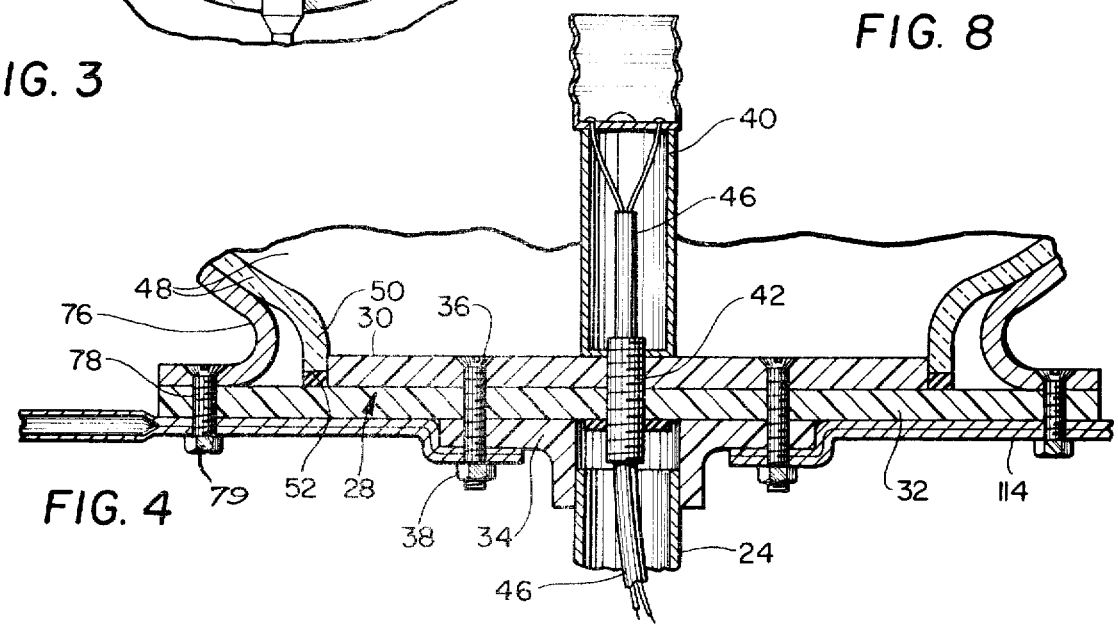
FIG. 4 is a section view taken generally along line 4—4 in FIG. 3.

In accordance with the invention, the weather vane assembly 20 comprises a base; a lamp socket mounted on said base; a globe supported on said base enclosing said lamp socket; a vane support member mounted adjacent said globe distant from said base including an upright pivot shaft secured thereto at one end and having a free end tapered to a point directed away from said base; a plurality of globe support bars mounted, respectively, to said base and said support member and encircling said globe in a contiguous manner; and a wind direction vane including a conical bearing substantially equidistant from its ends adapted to be freely received on the free end of said pivot shaft. As embodied herein, a base 28 as particularly illustrated in FIGS. 2, 3, and 4, is comprised of a pair of circular discs 30 and 32 which are positioned concentrically in a juxtaposed relationship, the disc 30 being of a smaller diameter than that of the disc 32. These discs which may, for example, be of one-quarter inch plexiglass or other suitable material in size and composition, are attached to a flange 34 by a plurality of screws 36 and nuts 38. Additionally, it will be appreciated that the base 28 may be fashioned from a single piece of material should that be considered desirable.

As particularly well illustrated in FIG. 4, a lamp socket 40 is threadedly received on a hollow nipple 42 which is itself threadedly engaged with the discs 30 and 32 in their central regions. In this manner, the lamp socket 40 is firmly mounted on the base 28 and is adapted to accommodate a variety of plain or decorative electric light bulbs at its upper end, such as a bulb 44. A two-wire insulated cable 46 may extend through a stuffing tube (not shown) in the roof of the house 22, then through the stanchion 24, and through the nipple 42 to energize the bulb 44. it will be appreciated that the lamp size or wattage can be adjusted that additionally, the construction described permits the height of the base of the socket 40 to be adjusted to provide optimum illumination for viewing the weather vane assembly during periods of darkness.

As further embodied herein, a principal element of the weather vane assembly 20 is a globe 48 composed of glass or other suitable translucent material which can be varied in size, shape, and color to add a new decorative dimension to the art of building weather vanes. Although decorative, the glove serves an important function in that it provides a protective cover for the lamp socket 40 and the light bulb 44.

With particular reference to FIG. 4, the globe 48 is illustrated as having an opening at its lower end defined by a lower rim 50 having an inner diameter which is preferably only slightly greater than the outer diameter of the disc 30. The lowermost portion of the rim 50 rests upon an annular gasket 52 which may be of a silicone type to cushion the globe and serving as a seal to keep out moisture and other elements of weather.

Figure 5:
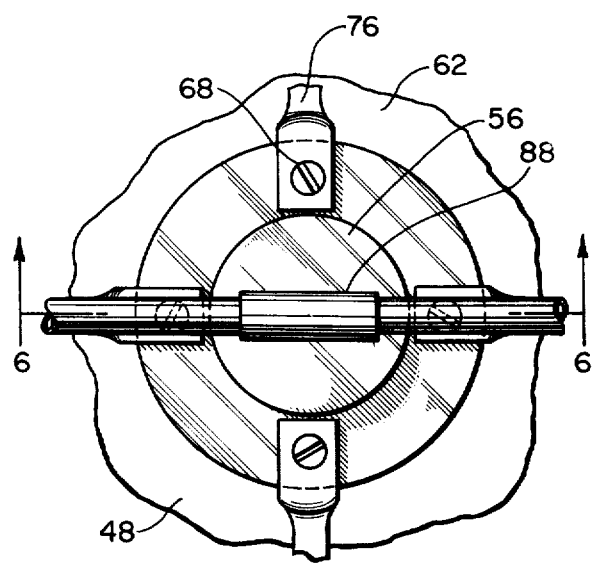
FIG. 5 is a top plan view of elements illustrated in FIG. 2.
Figure 6:
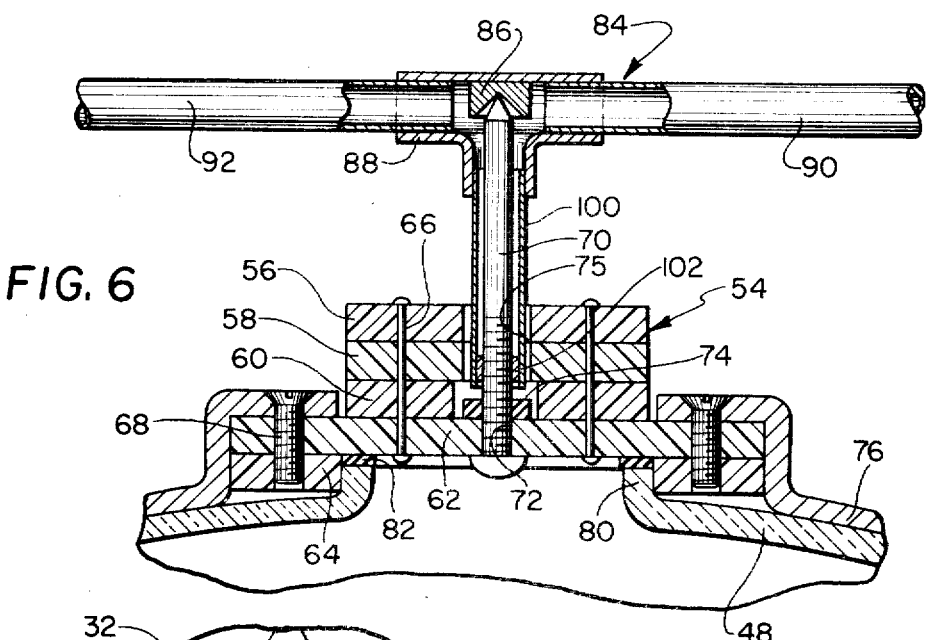
FIG. 6 is a cross-section view taken generally along line 6—6 in FIG. 5.

As further embodied herein, viewing now FIGS. 5 and 6, a vane support member, generally indicated by reference numeral 54, is positioned adjacent to an upper end of the globe 48. As illustrated, the vane support member 54 is composed of a plurality of discs numbered, respectively, 56, 58, 60, and 62, and a ring 64. These discs which may, for example, be of one-quarter inch plexiglass or other suitable material in size and composition, may be joined by a plurality of copper brads 66 or in some other suitable fashion. Likewise, the ring 64 may, for example, be of one-quarter inch plexiglass or other suitable material in size and composition, and may be attached by a plurality of screws 68 to the outer rim of the disc 62, the latter being of greater diameter than any of the discs 56, 58, and 60. Of course, it will be appreciated that the vane support member 54 may be fashioned from a single piece of material should that be deemed desirable.

An upright pivot shaft 70 is freely received through a central bore 72 of the disc 62 and is secured thereto by a nut 74 in such fashion that a free end of the pivot shaft 70 tapered to a point is directed away from the base 28 (see FIG. 2). It will be appreciated that the discs 56, 58, and 60 are suitably appertured in their central regions forming a cavity 75 to freely accommodate the pivot shaft 70.

As further embodied herein, a plurality of globe support bars 76 are mounted, respectively, to the base 28 by means of screws 78 and associated nuts 79 and to the vane support member 54 by the screws 68 and encircle the globe 48 in a contiguous manner. The globe support bars are preferably fashioned from copper tubing and are flattened at their ends for mounting to the base 28 and to the vane support member 54. Similar to the construction of the globe adjacent the base 28, the globe 48 also has an upper rim 80 which has an outer diameter slightly smaller than the inner diameter of the ring 64 of the vane support member 54. Additionally, an annular gasket 82 which may be of the silicone type acts as a cushion, allows for expansion and contraction between the globe 48 and the associated structures of the assembly 20, and seals the globe 48 with the vane support member 54.

As further embodied herein, and with continued reference to FIG. 6, a wind direction vane generally indicated by reference numeral 84 includes a conical jewel or hard metal bearing 86 situated substantially equidistant from its ends and adapted to be freely received on the free end of the pivot shaft 70. The vane 84 includes a central tee member 88 which may be of copper stock and to which the conical bearing 86 may be attached by means of a suitable adhesive and appropriately positioned for placement on the point at the free end of the pivot shaft 70. A pair of support arm 90 and 92, respectively, extend outwardly in opposite directions from the central tee member 88. These support arms may be of copper tubing, for example, and soldered to the central tee member 88. At their ends, the support arms 90 and 92 may be flattened enabling a pointer 94 to be attached to the former and a tailpiece 96 to be attached to the latter by means of brass screws 98 (FIG. 2).

In light of the fact that the tailpiece 96 is larger in area than the pointer 94, and therefore heavier, the resulting imbalance in weight of the wind direction vane 84 may be compensated for by the addition of molten lead (not shown) inside the support arm 90, that is, at the pointer end. The lead weight is added until the vane 84 is balanced as the conical bearing 86 rests upon the pointer end of the pivot shaft 70. This occurs when the wind direction vane 84 finally comes to rest in a horizontal plane.

A sleeve 100, also preferably composed of copper tubing, is mounted on the tee member 88 and extends in a downward direction. It may also be attached to the tee member 88 by means of solder or in some other suitable fashion and extends into the central cavity 75, previously described, in the central regions of the discs 56, 58, and 60 (FIG. 6). A seal 102 at the base of the sleeve 100 serves to protect the pivot shaft 70 and the bearing 86 against the corrosive effects of moisture in the outside atmosphere. Being resilient, the seal permits slight movement of the wind direction vane 84 in elevation while granting it freedom of rotation in asimuth.

As further embodied herein, the weather vane assembly 20 includes a plurality of cardinal point letters 104, 106, 108, and 110 which are respectively mounted by means of brass screws 112 to the ends of a plurality of support fingers 114 at locations distant from the lamp socket 40. The cardinal point letters are preferably fashioned from sheet copper or stained glass to match the material selected for the pointer 94, the tailpiece 96, and the globe 48. The support fingers 114 extend radially from the base 28 and are releasably secured to the base by means of the screws 36 and 78.

The invention which has now been disclosed related to improvements in weather vanes which are both functional and decorative. The globe 48 and the wind direction vane 84 are each mounted in a fashion which is effective to protect the weather vane assembly against the deteriorating effects of constant outdoor exposure. Additionally, the single point mounting arrangement of the wind direction vane 84 assures its accuracy even under light wind conditions.

Figure 7:
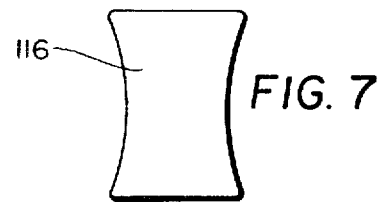
FIGS. 7 and 8 are side elevation views of typical alternative globes which may be employed with the invention.
Figure 8:
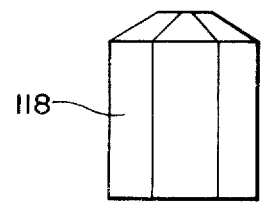

From an aesthetic standpoint, the globe 48 may be readily removed by the loosening or removal of the screws 68 and 78 and one of the globe support arms 76. Thereupon, it could be replaced by another globe of a different color. Other globe shapes such as a globe 116 (FIG. 7) or globe 118 (FIG. 8) may be employed provided revised globe support arms, appropriately contoured to the new globe shape, are used in place of the support arms 76. It will be appreciated that the globes 116 and 118 are merely exemplary of a large number of shapes of globes which could be utilized with the invention. Similarly, by removing the screws 98, the pointer 94 and the tailpiece 96 can be removed and replaced with similar elements of sheet copper or stained glass of another color. This is also true of the cardinal point letters 104, 106, 108, and 110 upon removal of their associated fasteners 112.

The invention, then, in its broader aspects is not limited to the specific details shown and described and departures may be made from such details without departing from the principles of the invention, and without sacrificing its chief advantages.

What is claimed is:

1. An illuminated weather vane assembly comprising:
   a base;
   a lamp socket mounted on said base;
   a translucent globe supported on said base enclosing said lamp socket;
   a vane support member mounted adjacent said globe distant from said base including an upright pivot shaft secured thereto at one end and having a free end tapered to a point directed away from said base;
   a plurality of globe support bars mounted, respectively, to said base and said support member and encircling said globe in a contiguous manner; and
   a wind direction vane including a conical bearing substantially equidistant from its ends adapted to be freely received on the free end of said pivot shaft.

2. An illuminated weather vane assembly as set forth in claim 1 wherein said vane includes a central tee member, said conical bearing being fixed therein; a pair of support arms mounted on said tee member and extending therefrom in opposite directions; a sleeve mounted on said tee member and depending therefrom; and wherein said vane support member has a cavity formed therein to freely receive a lower end of said sleeve therein thereby permitting freedom of movement of said vane in asimuth while restraining said vane against substantial movement in elevation.

3. An illuminated weather vane assembly as set forth in claim 1 including a plurality of cardinal point letters; support fingers extending radially from said base mounting said letters distant from said lamp socket; and fasteners releasably securing said support bars and said support fingers to said base and releasably securing said support bars to said support member.

4. An illuminated weather vane assembly comprising:
   a base formed as a circular disc lying substantially in a plane;
   a lamp socket mounted centrally on said base and having a longitudinal axis substantially perpendicular to the plane of said disc;
   a translucent globe having a lower rim supported on said base, and an upper rim and enclosing said lamp socket;
   a vane support member engaging said upper rim and having a cylindrical cavity formed therein on its side distant from said base, said lamp socket and said cavity being coaxial of a line substantially perpendicular to the plane of said base, said vane support member including an upright pivot shaft secured thereto at one end extending through and coaxial with said cavity and having a free end tapered to a point directed away from said base;
   a plurality of globe support bars mounted, respectively, to said base and said support member and encircling said globe in a contiguous manner;
   a wind direction vane including a central tee member, a conical bearing fixed thereto substantially equidistant from its ends adapted to be freely received on said point at the free end of said pivot shaft, a pair of support arms lying in a plane substantially parallel with said base extending outwardly in opposite directions from said central tee member, and a sleeve depending from said central tee member and substantially coaxial with said pivot shaft, a lower end thereof being freely received within said cavity thereby permitting freedom of movement of said vane in azimuth while restraining said vane against substantial movement in elevation.

5. An illuminated weather vane assembly as set forth in claim 4 including a plurality of cardinal point letters; support fingers extending radially from and lying in a plane of said base mounting said letters, respectively, at locations equidistant from said lamp socket; and fasteners releasably securing said support bars and said support fingers to said base and releasably securing said support bars to said support member.

6. An illuminated weather vane assembly as set forth in claim 5 including a pointer; fasteners releasably mounting said pointer to an end of one of said support arms; a tailpiece; and fasteners releasably mounting said tailpiece to an end of the other of said support arms; and fasteners releasably mounting said cardinal point letters to the ends of their respective said support fingers.

7. An illuminated weather vane assembly as set forth in claim 6 wherein said pointer, said tailpiece, and said cardinal point letters are of stained glass composition.

8. An illuminated weather vane assembly as set forth in claim 6 wherein said pointer, said tailpiece, and said cardinal point letters are of copper composition.

* * * * *